United States Patent [19]
Ishiguro

[11] Patent Number: 5,832,315
[45] Date of Patent: Nov. 3, 1998

[54] BUILT-IN FLASH CAMERA

[75] Inventor: Minoru Ishiguro, Omiya, Japan

[73] Assignee: Fuji Photo Optical Co., Ltd., Saitama, Japan

[21] Appl. No.: 968,908

[22] Filed: Nov. 6, 1997

Related U.S. Application Data

[63] Continuation of Ser. No. 627,069, Apr. 3, 1996, abandoned.

[30] Foreign Application Priority Data

Apr. 3, 1995 [JP] Japan .................................... 7-077717

[51] Int. Cl.$^6$ .................................................. G03B 15/05
[52] U.S. Cl. ............................................................ 396/61
[58] Field of Search ................................ 396/61, 64, 65, 396/98, 106, 166, 167, 169

[56] References Cited

U.S. PATENT DOCUMENTS 4,941,009  7/1990  Yoshida .................................... 354/402
5,255,047 10/1993  Ishimaru et al. ......................... 354/416

FOREIGN PATENT DOCUMENTS 56-149022 11/1981 Japan .

*Primary Examiner*—Daniel P. Malley

[57] ABSTRACT

A built-in flash camera includes a strobe which is flashed regularly, a photometry part for measuring a brightness within a shot visual field and an automatic exposure mechanism. A changeover brightness is set to be lower than a limitation brightness (reference external light brightness) in which an AE control can be performed. When the brightness measured by the photometry part is lower than the changeover brightness, the strobe is flashed so that the exposure of the strobe can be standard (100%). When the brightness measured by the photometry part is higher than the changeover brightness, the exposure of the strobe light is decreased to be 75% of the standard exposure. As a result, the exposure of the strobe can be prevented from being excessively large when the external light is in a proximity of the reference external light brightness.

8 Claims, 10 Drawing Sheets

OPENING SHUTTER

STROBE FLASHING

EXPOSURE

STROBE FLASHING

EXPOSURE

BUILT-IN FLASH CAMERA

This application is a continuation of application Ser. No. 08/627,069 filed on Apr. 3,1996, now abandoned.

BACKGROUND OF THE INVENTION

1. Field of the Invention

The present invention relates to a built-in flash camera and more particularly to a built-in flash camera provided with an automatic exposure function and an electronic flash (strobe) which is flashed regularly.

2. Description of the Related Art

If taking a picture under back lighting, there is a problem in that an object looks dark. Furthermore, the object is shadowed when taking a picture in the condition that the sun is just above the object even though there is no back lighting. In order to prevent the above-mentioned problem, there is a known method for using the strobe regularly even in the daylight (regular flash type), so that a strobe light can be added to the exposure of the external light.

Because the latitude of a negative color film is large with respect to an overexposure, it is preferable to always use the strobe when the negative color film is used. However, if the exposure of the strobe, which is flashed at a stop value corresponding to an object distance (flashmatic), is added to the exposure of the external light, there is a striking contrast between the object and the background, and the background looks dark.

The conventional built-in flash camera of the regular flash type is disclosed in, for example, a Japanese Patent Application Laid-open No. 56-149022. The built-in flash camera disclosed in the document is provided with a sensitizing element for measuring the quantity of external light around an object. The built-in flash camera also controls the quantity of the strobe light in accordance with the quantity of light measured by the sensitizing element.

As shown in FIG. 10, when the quantity of the external light is 0%, the quantity of the strobe light is controlled so that the exposure contribution rate thereof can be 100%, which is enough for exposing the film by the strobe light only. Also, the quantity of the strobe light is decreased so that the exposure contribution rate thereof is 35% until the quantity of the external light increases and the exposure contribution rate thereof reaches 75%. As a result, the total exposure contribution rate is more than 100%. Furthermore, if the quantity of the external light increases, the stop is automatically adjusted so that the exposure contribution rate of the external light can be fixed at 75%. In this case, the quantity of the strobe light is also adjusted to be fixed at 35%. Therefore, the sum of the exposure contribution rate of the external light and that of the strobe light is 110%, which is enough for exposing the film.

However, in the above-described conventional built-in flash camera, the strobe light is flashed at 35% exposure contribution rate, even if an external light brightness is sufficiently high. Therefore, the quantity of light on the object is increased, so that the ratio of the background to the object in the quantity of light goes down. Therefore, there is a problem in that the background looks dark and the atmosphere of the photograph is ruined.

When the object, which is at a short distance from the camera, is photographed, the background is covered with the object in a large area. However, the exposure contribution rate of the strobe light is at least 35% regardless of the distance between the camera and the object. Therefore, the quantity of light on the object's surface increases because of the strobe light, so that the object is washed out on the photograph.

On the other hand, the limit of the external light brightness at which the exposure contribution rate of the external light can be controlled to be 100% by automatic adjustment for the shutter and the stop, that is, the limitation value of the external light brightness at which an AE automatic control can be performed, is defined as a strobe changeover brightness. The strobe light is controlled so that the exposure contribution rate of the strobe light can be 100% when the external brightness is lower than the strobe changeover brightness. The strobe light is controlled so that the exposure contribution rate of the strobe light can be lower than 100% when the external brightness is higher than the strobe changeover brightness. However, there are the following problems in this case.

That is, when the external light brightness at photographing is in a proximity of the strobe changeover brightness, the sum of the exposure of the external light and the exposure of the strobe (total exposure) is far from the proper exposure. If the photographing is performed under the above-mentioned condition, the exposure is excessively large, and the object is washed out on the photograph. Moreover, when the brightness of the object is adjusted to be proper at the time of printing, the background looks dark on the photograph even though the photographing is performed in the moderate external light.

SUMMARY OF THE INVENTION

The present invention has been developed in view of the above-described circumstances, and has its object to provide a built-in flash camera capable of controlling the strobe light so as to photograph an object under an appropriate exposure.

To achieve the above-mentioned object, the built-in flash camera including a strobe according to the present invention comprises a photometry part for measuring a brightness within a shot visual field, an automatic exposure mechanism for opening and closing a combination shutter and a stop blade so as to obtain a standard exposure under external light of which brightness is more than a reference external light brightness in accordance with the brightness measured by the photometry part, and a strobe light control part for directing the strobe to flash regularly in connection with the opening and closing shutter and for decreasing the exposure of the strobe from the standard exposure in accordance with the brightness measured by the photometry part. The reference external light brightness is defined as an external light brightness at which an optimum exposure is obtained in a predetermined shutter open time, and the standard exposure is defined as the exposure in the reference external light brightness. The strobe light control part sets a strobe changeover brightness as a brightness which is lower than the reference external light brightness by a predetermined value. The strobe changeover brightness is a start brightness for decreasing the exposure from the standard exposure.

Furthermore, to achieve the above-mentioned object, the present invention comprises a photometry part for measuring a brightness within a shot visual field, a focusing part for measuring a distance between the camera and an object within the shot visual field, an automatic exposure mechanism for opening and closing a combination shutter and a stop blade so as to obtain a standard exposure under external light of which brightness is more than a reference external light brightness in accordance with the brightness measured by the photometry part, and a strobe light control part for directing the strobe to flash regularly in connection with the opening and closing shutter and for decreasing the exposure of the strobe from the standard exposure in accordance with the brightness measured by the photometry part and the distance measured by the focusing part. The reference external light brightness is defined as an external light brightness at which an optimum exposure is obtained in a predetermined shutter open time, and the standard exposure is defined as the exposure in the reference external light brightness. The strobe control part setting a strobe changeover brightness as a brightness which is lower than the reference external light brightness by a predetermined value, when the distance measured by the focusing part is less than a predetermined distance. The strobe changeover brightness is a start brightness for decreasing the exposure from the standard exposure.

According to the present invention, the brightness within the shot visual field is measured by the photometry part which is provided in the camera. Because the standard exposure cannot be obtained only from the external light by the automatic exposure mechanism when the measured brightness is lower than the reference external brightness, the strobe is flashed so that the shortage can be made up for and the exposure can be slightly excessive. The standard exposure can be obtained only from the external light by the automatic exposure mechanism when the measured brightness is more than the reference external light brightness. However, the strobe is flashed while the exposure is controlled in accordance with the brightness measured by the photometry part so that the exposure can be slightly excessive in view of the light balance between the object and the background. The exposure of the strobe is gradually decreased from the standard exposure. In the control of the strobe which is flashed regularly, the strobe changeover brightness at which the exposure of the strobe is decreased from the standard exposure, is set to be lower than the reference external light brightness by a predetermined value. Therefore, the exposure can be prevented from being excessively large when the external light is in a proximity of the reference external light brightness, and the total exposure can be prevented from being excessively large. As a result, the light balance between the object and the background can be kept, so that the object is not washed out on the photograph, and the background is not dark. That is, a good picture can be taken.

According to the other mode of the present invention, the built-in camera is provided with the focusing part for measuring the distance between the camera and the object, and the strobe is flashed while the exposure is controlled in accordance with the brightness measured by the photometry part and the distance measured by the focusing part. The exposure of the strobe can be gradually decreased from the standard exposure. In the control of the strobe which is flashed regularly, the distance between the camera and the object is measured. The strobe changeover brightness at which the exposure of the strobe is decreased from the standard exposure is set to be lower than the reference external light brightness, when the distance is less than a predetermined one. Therefore, the exposure of the strobe can be prevented from being excessively large when the external light is in a proximity of the reference external light brightness, and the total exposure can be prevented from being excessively large.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

Figure 1:
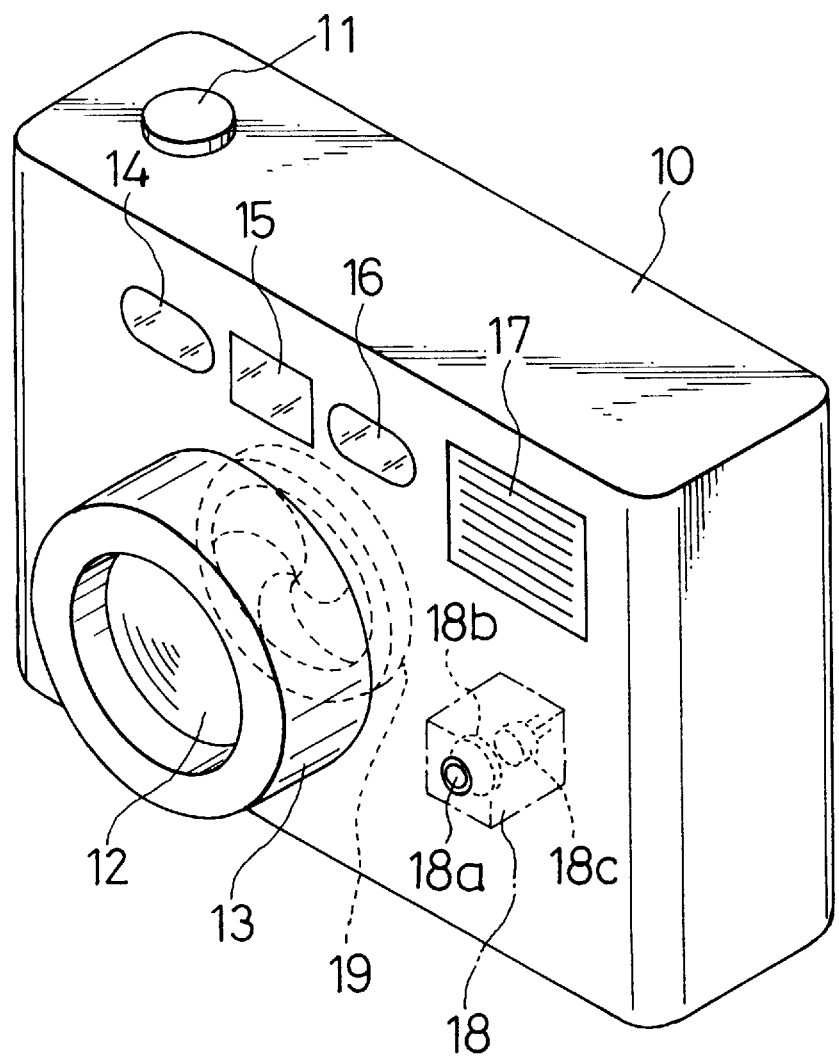
FIG. 1 is a perspective view illustrating an external appearance of an embodiment of a built-in flash camera according to the present invention.
Figure 2A:
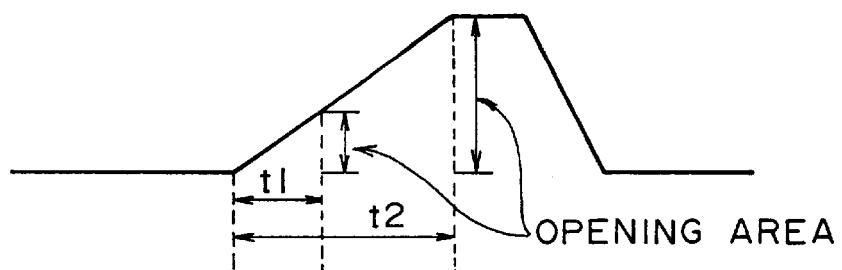
FIG. 2(a), 2(b), 2(c), 2(d) and 2(e) are time charts illustrating a relationship between a shutter opening timing and a flash timing.
Figure 2B:
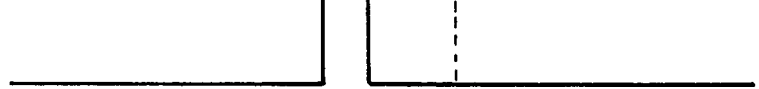
Figure 2C:
Figure 2D:
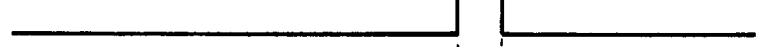
Figure 2E:
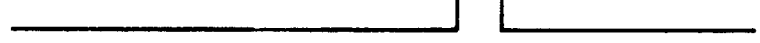

FIG. 1 is a perspective view illustrating an external appearance of an embodiment of a built-in flash camera according to the present invention. In a rectangular parallelepiped built-in flash camera of FIG. 1, a shutter button 11 is arranged on a top surface of a camera body 10, and a mirror barrel 13 in which a lens 12 is incorporated, is attached at a central portion on a front surface of the camera body 10.

A projector 14, a finder 15, a light acceptor 16, and an strobe 17 are arranged on an upper portion of the front surface of the camera body from the left of the drawing. The projector 14 and the light acceptor 16 compose a focusing part for measuring a distance from the camera to the subject. The focusing part measures the distance on the basis of, for example, a principle of triangulation.

A photometry part 18 for measuring the brightness of the external light within the visual field, is provided at the right side of the mirror barrel 13 on the front surface of the camera body 10. The photometry part 18 is provided with an incident window 18a which is formed on the surface of the camera body 10, a lens 18b which is arranged within the incident window 18a, and a photosensor 18c in which a light accepting surface is arranged in a proximity of the image-forming position of the lens 18b.

The light accepting surface of the photo sensor 18c is arranged at a position displaced from an image-forming position of the lens 18b by a predetermined distance. Therefore, a perfect object image is not formed on the light accepting surface of the photo sensor 18c, and an average quantity of the external light in the whole visual field including the object is measured by the photo sensor 18c.

Furthermore, a shutter 19 for providing a film with the required exposure is provided on the optical axis of the lens 12 within the camera body 10.

The strobe 17 automatically flashes in a timing at which the shutter 19 is opened (synchronized flash). In this embodiment, the flash timing of the strobe 17 is subtly staggered from an open timing of the shutter 19, so that exposure on the object surface can be adjusted.

How to adjust the exposure will be explained with reference to the time chart of FIG. 2. The time chart of FIG. 2 shows how much exposure can be obtained by flashing the strobe 17 after the shutter 19 starts working. As shown in FIG. 2 (a), the opening area of the shutter 19 is still small when the strobe is flashed when a time t1 has passed after the shutter starts working (see FIG. 2 (b)), and the light which exposes the film is small. So, the exposure is small.

On the other hand, when the strobe is flashed when a time t2 has passed after the shutter starts working (see FIG. 2 (d)), the opening area of the shutter 19 is the largest, so the light which exposes the film is large. As a result, the exposure is almost twice as much as the exposure in the time t1 (see FIG. 2 (e)). Thus, the flash timing of the strobe 17 is adjusted so that the exposure of the strobe 17 can be freely adjusted without changing the emission quantity of the strobe 17.

In this embodiment, the flash timing of the strobe light for obtaining the optimum exposure for photographing is controlled by a distance between the camera and the object measured by the projector 14 and the acceptor 16, and the external light brightness in the shot visual field, which is measured by the photometry part 18.

Figure 3:
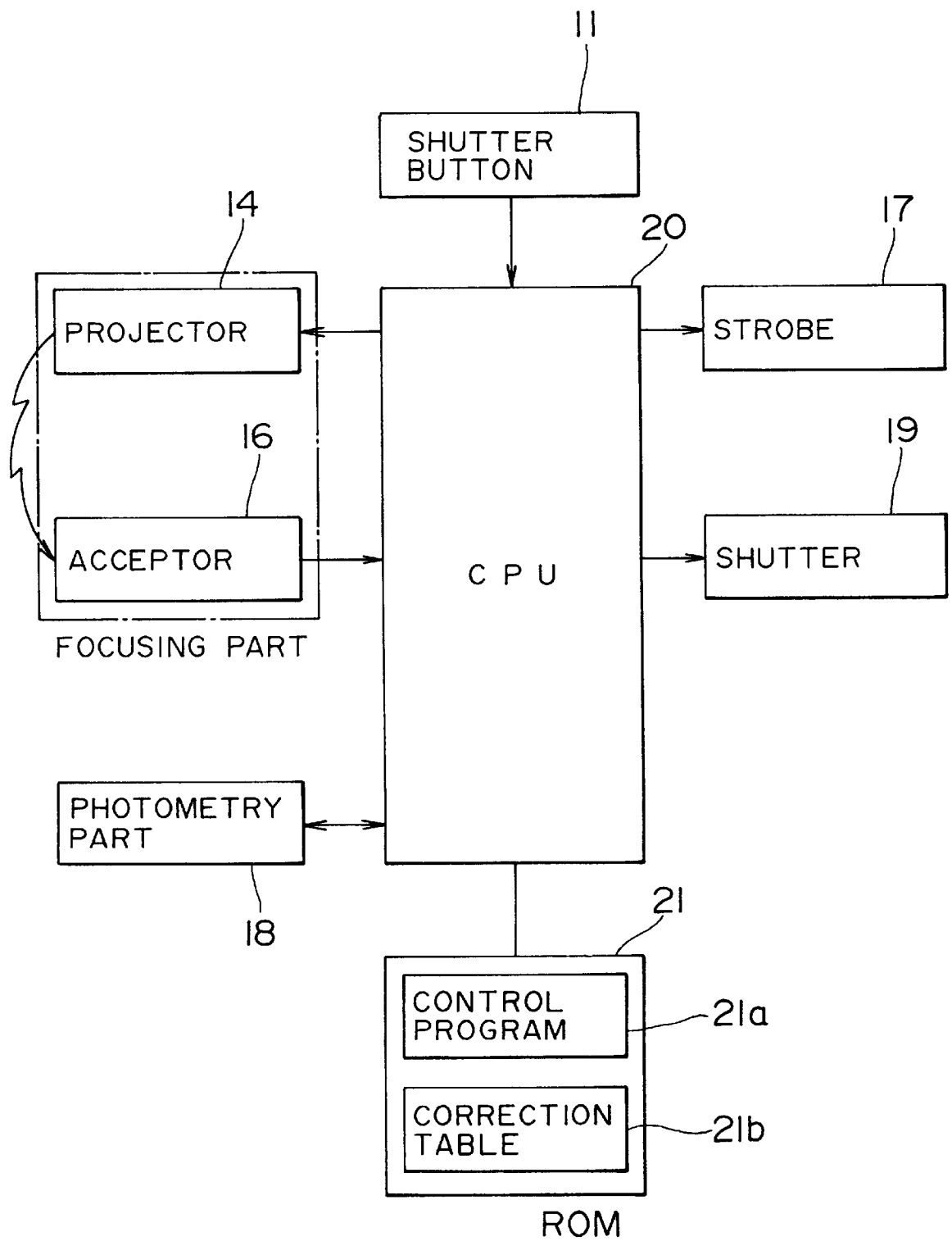
FIG. 3 is a block diagram illustrating a structure for controlling the flash timing.

FIG. 3 is a block diagram illustrating a specific structure for controlling a flash timing. As shown in FIG. 3, the flash timing is controlled by a CPU 20 on the basis of a control program 21a, which is written in a ROM 21.

The CPU 20 receives a half-push signal or a full-push signal from the shutter button 11. When the CPU 20 receives the half-push signal from the shutter button 11, the CPU 20 provides the projector 14 with a signal for measuring the distance between the camera and the object, and provides the photometry part 18 with a signal for measuring the brightness of the external light within the visual field. The projector 14 (and the light acceptor 16) and the photometry part 18 perform the focusing and the photometry, respectively, on the basis of the above-mentioned signals, and provide the CPU 20 with the measurement results. Further, when the CPU 20 receives the full-push signal from the shutter button 11, the CPU 20 provides the strobe 17 with a signal for flashing, and provides the shutter 19 with a signal for opening and closing the shutter.

Figure 4:
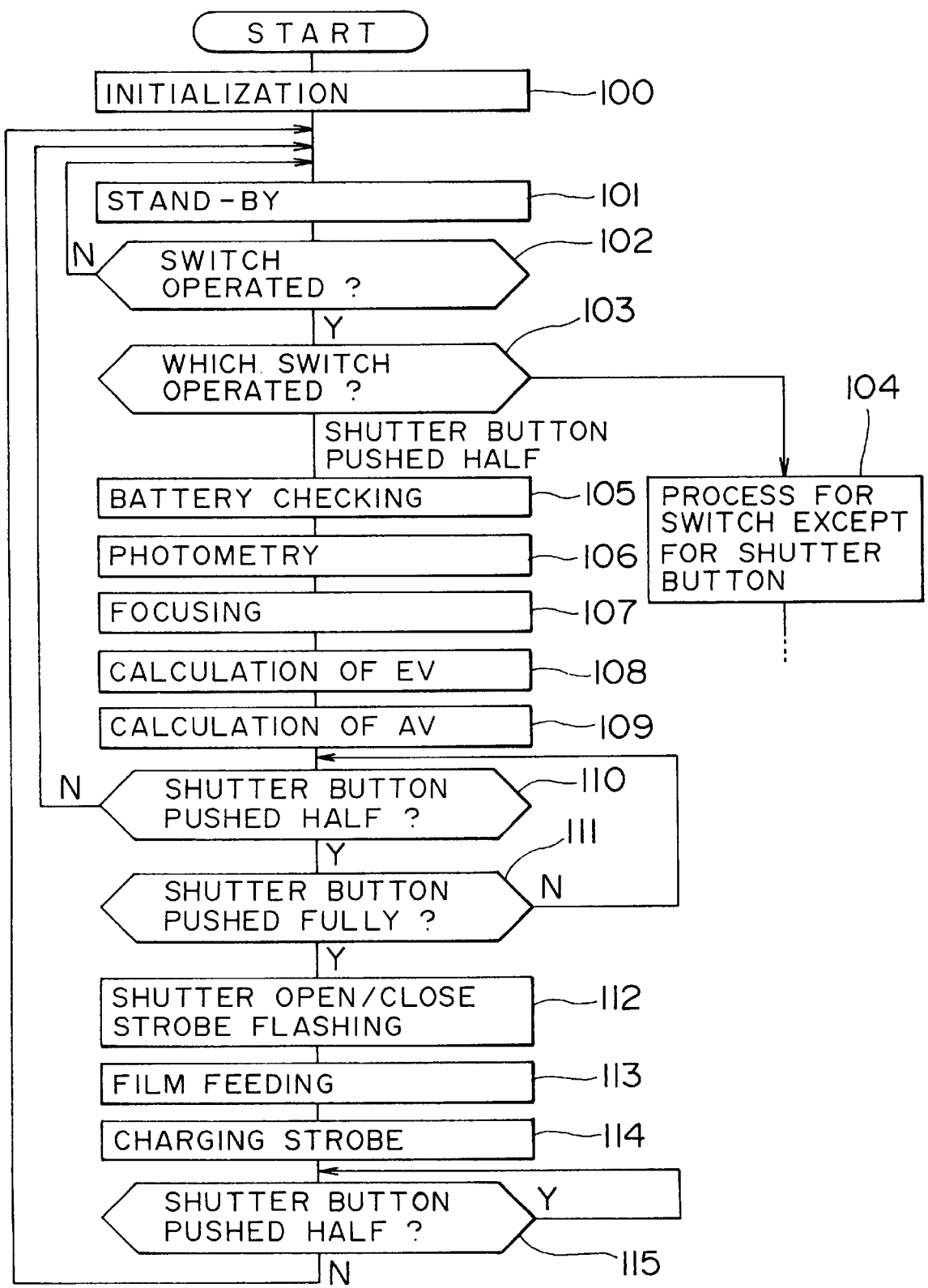
FIG. 4 is a flow chart illustrating a procedure for controlling the flash timing.

Next, an explanation will be given of a flow in a processing of controlling the flash timing which is performed by the CPU 20 on the basis of the control program 21a with reference to the flow chart in FIG. 4.

First, when the power source switch is turned on, the initialization processing such as clearing the memory included in the CPU 20 and setting an I/O port, are carried out (Step 100). Then, the processing waits until some switch is started (Step 101). There is a self-timer switch, and a zoom switch, which are not shown in the drawing, in addition to the shutter button 11. When one of the switches is started (Step 102), it is detected which switch has been started (Step 103). If a switch other than the shutter button 11 has been started, the processing for each switch is performed (Step 104).

When it is detected that the shutter button 11 is half pushed in the step 103, the residual capacity of the power source electronic battery is checked (Step 105). Next, the signal from the CPU 20 is received by the photometry part 18, and the external light brightness in the shot visual field is measured by the photometry part 18 (Step 106). Furthermore, the signal from the CPU 20 is received by the projector 14, and the distance between the camera and the object is measured by the projector 14 and the acceptor 16 (Step 107). The measurement is carried out on the basis of, for example, the principle of the triangulation. Then, a brightness value (BV) of the external light brightness, which is found in the step 106, and a speed value (SV) of the film sensitivity are substituted for the following equation (1), so that an exposure value EV, which is used for a control of the shutter 19, can be calculated (Step 108).

$$EV = SV + BV \tag{1}$$

By the calculation of the EV value, a combination of the shutter speed and the stop value is determined in order to obtain the exposure required for photographing.

Next, an aperture value AV is calculated so as to determine the flash timing of the strobe 17 (Step 108). The AV value corresponds to the opening area of the shutter 19 when the strobe 17 is flashed. That is, it can be judged from the AV value which opening area, which increases gradually after the shutter starts working, is the most appropriate to flash the strobe 20. Therefore, the flash timing of the strobe 17 can be found from the AV value.

In order to calculate the AV value, the distance between the camera and the object, which is found in the step 107, is substituted for an equation (2), and a guide number (GNo.) is substituted for an equation (3), so that a DV value and a GV value can be found.

$$DV = -2\log_2 D \tag{2}$$

$$GV = 2\log_2 GNo. \tag{3}$$

Figure 5:
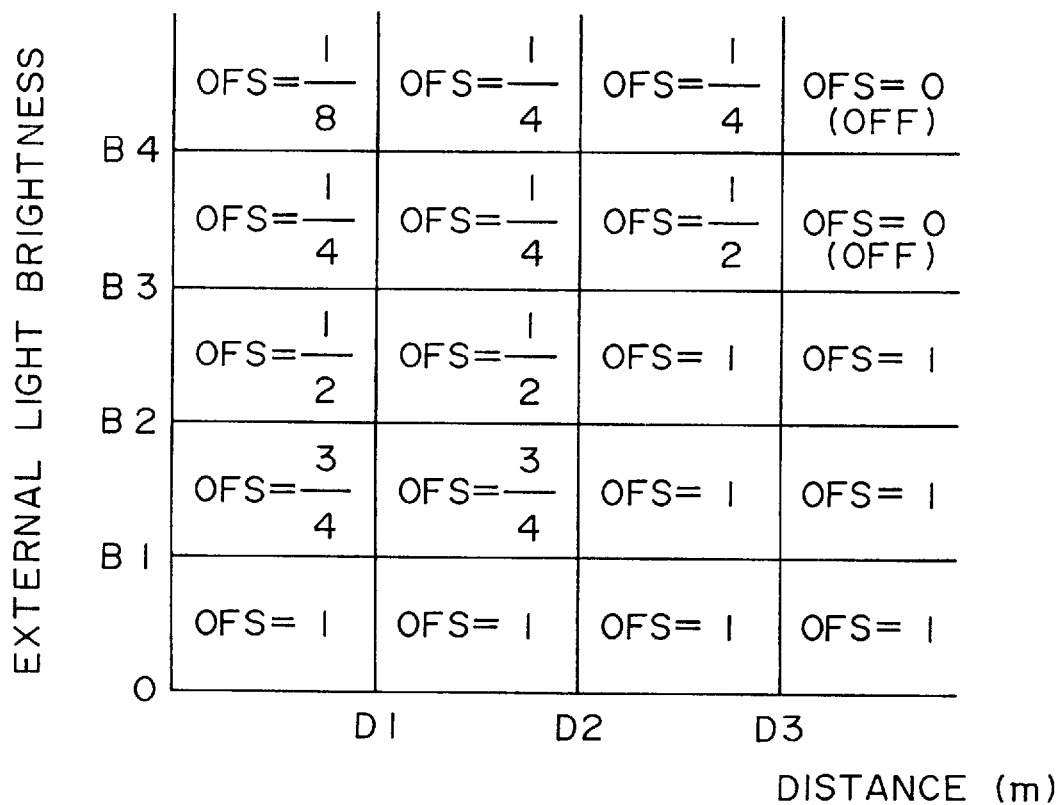
FIG. 5 is a view illustrating one example of a correction table.

Next, an OFS value, which is a correction value, is found from the correction table 21b, which is written in the ROM 21. The parameters of the correction table 21b are a distance between the camera and the object, and the external light brightness within the shot visual field as shown in the example of FIG. 5. In this example, the external light brightness within the shot visual field is classified into 5 levels (below B1, B1–B2, B2–B3, B3–B4, over B4, and B1<B2<B3<B4), and the distance between the camera and the object is classified into 4 levels (below D1, D1–D2, D2–D3, over D3, and D1<D2<D3). The OFS value can be found from the external light brightness within the shot visual field, which is measured in Step 106, and the distance between the camera and the object, which is measured in Step 107. For instance, when the distance is D1–D2, and the brightness is B2–B3, the OFS is ¼. When the distance is more than D3, and the brightness is B1–B2, the OFS is 1. The OFS value is substituted for the following equation (4), so that the FL value can be found.

$$FL = \log_2 OFS \tag{4}$$

The DV value, the GV value, the FL value, and the film sensitivity (SV), which are found from the abovementioned equations (1), (2), (3), and (4), are substituted for the following equation (5), so that the AV value can be found (Step 109).

$$AV = GV + SV + DV + FL - 5 \quad (5)$$

Incidentally, the film sensitivity and the SV value correspond to each other, that is, SV5, 6, 7, 8, 9 . . . respectively correspond to ISO 100, 200, 400, 800, 1600 . . .

The processing (Step 110, 111) stands by until the shutter button 11 is fully pushed from the half-push state. If the button is not fully pushed and the finger is removed from the shutter button 11, the processing returns to the step 101. When the shutter button 11 is fully pushed, the shutter 19 is opened and closed so as to take a picture. The opening and closing of the shutter 19 are controlled on the basis of the EV value which is calculated in the step 108. Then, the strobe 17 is flashed at a timing which the opening area of the shutter 19 equals to the AV value which is calculated in the step 109 (Step 112). The exposure required for photographing can be obtained by the strobe 17.

The film is fed (Step 113) after the shutter 19 is closed, and the strobe 17 is charged (Step 114). Then, the processing waits if the shutter button 11 is half pushed (Step 115), and after a finger leaves from the shutter button 11 and the shutter button 11 returns to its original condition, the processing returns to the step 101.

In this embodiment, when the AV value is calculated in the step 109, the exposure of the strobe 17 is adjusted on the basis of the correction table 21b. As described above, in the correction table 21b, the distance between the camera and the object is classified into 5 levels, and the external light brightness within the shot visual field is classified into 4 levels. The OFS values, which are correction values for the exposure of the strobe 17, are minutely allotted to each level (see FIG. 5). Basically, when the external light brightness is less than B1, the external light brightness is not sufficient for the required exposure, so the correction value OFS=1, wherein the exposure of the strobe 17 is not decreased, is allotted. When the external light brightness is more than B1, the correction values OFS=¾ to ⅛, in which the exposure of the strobe 17 is decreased, are allotted. In this case, the decreased amount is adjusted so as to become larger when the distance between the camera and the object is short.

The relationship between the exposure of the strobe 17, which is corrected by the correction table 21b, and the exposure of the external light within the shot visual field will hereunder be explained with reference to FIGS. 6, 7, 8, and 9. Incidentally, the film sensitivity is ISO 100 (SV=5) in FIGS. 6, 7, 8, and 9, which corresponds to each distance (below D1, D1–D2, D2–D3, over D3) in the correction table 21b. Incidentally the distance D1–D3 is, for example, 1.3 m, 2 m, and 9 m, respectively.

Figure 6:
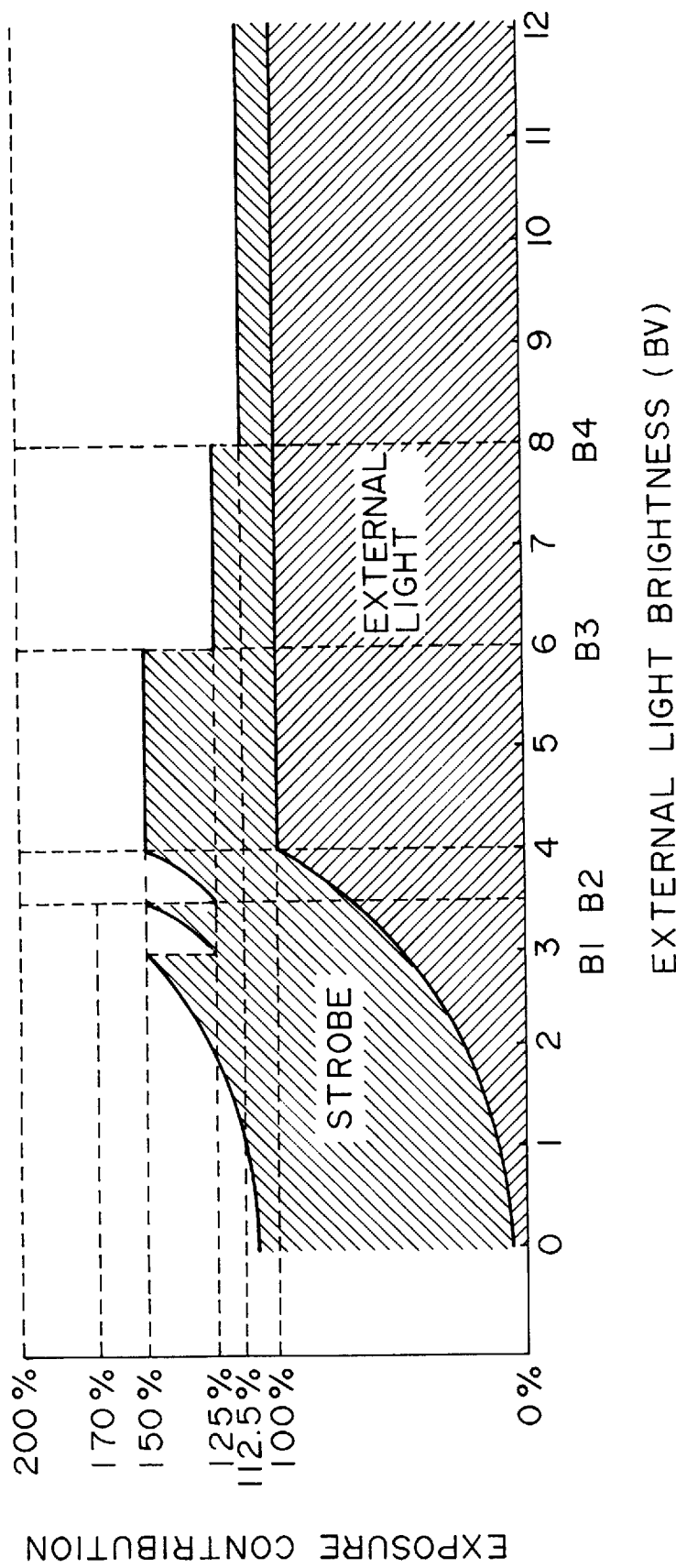
FIG. 6 is a view illustrating a relationship between an exposure of a strobe and an exposure of external light within a shot visual field when a distance between the camera and the object is less than D1.

FIG. 6 is a view illustrating the relationship between the exposure of the strobe 17 and the exposure of the external light when the distance between the camera and the object is less than D1. As shown in FIG. 6, when the external light brightness is less than BV4, the shutter 19 is opened only for a predetermined constant time. This is because shutter should not be opened for more than the predetermined constant time in order to remove the influence of a camera shake. Therefore, a sufficient exposure of 100%, which is required for photographing, is not provided by the external light only. That is, BV4 is the limitation brightness for a so-called automatic exposure (AE) control.

Therefore, the exposure of the external light keeps increasing until the external light brightness reaches BV4. When the external light brightness is more than BV4, the shutter 19 is controlled by the AE control function, so that the exposure of the external light is adjusted to keep the exposure of 100%. As a result, the exposure of the external light is fixed when the external light brightness is more than BV4.

On the other hand, the exposure of the strobe 17 is of 100% which is required for photographing when the external light brightness is less than B1. OFS=1, OFS=¾, OFS=½, OFS=¼, OFS=⅛ are respectively allotted for the external light brightness below B1, B1–B2, B2–B3, B3–B4, over B4, in the correction table 21b.

The total exposure for exposing the film is the sum of the exposure of the external light and the exposure of the strobe. In the brightness (B1 and B2), which is lower than BV4 and in which the exposure contribution of the external light gradually becomes larger, the exposure of the strobe is changed over so as to decrease the exposure contribution of the strobe. That is, a changeover control is carried out so as to decrease the exposure contribution rate to 75% in a changeover brightness B1, and the changeover control is carried out to decrease the exposure contribution rate to 50% in the changeover brightness B2. As a result, the total exposure is prevented from being excessively larger than the reasonable exposure. Incidentally, the exposure of the strobe and the changeover brightness are determined in such a manner that the total exposure can always be a reasonable exposure.

As a result, the exposure of the strobe can be prevented from being excessively large even if the external light brightness is in a proximity of BV4 which is the limitation value for the AE control. Therefore, the balance in the quantity of light between the object and the background can be maintained, and the object can be prevented from being washed out.

Moreover, in the external brightness more than BV4, the exposure of the strobe 17 gradually decreases as the external light brightness becomes higher. That is, the exposure contribution rate is 50% in the brightness B2–B3(BV6), 25% in the external light brightness B3–B4, and 12.5% in over B4.

When the external light brightness is high, if the strobe 17 is flashed in such a manner that the exposure of the strobe 17 is fixed, the ratio of the background to the object in the quantity of light is lowered. As a result, the background on a print looks dark even though the external light is well-lighted. In this embodiment, since the exposure of the strobe 17 gradually decreases as the external brightness becomes higher, the ratio of the background to the object in the quantity of light is not lowered even if the external light brightness is high. Therefore, even when the photographing is performed in the high brightness, the background on the print is not dark. As a result, the photographic atmosphere is not ruined. Incidentally, as described later, even if the distance between the camera and the object is more than D1, the exposure of the strobe 17 is adjusted so as to decrease gradually as the external light brightness becomes higher. Therefore, the same effect can be achieved even if the distance between the camera and the object is large.

When the distance between the camera and the object is less than D1, the exposure of the strobe 17 is extremely small (exposure contribution rate is 12.5%) in the external brightness of more than B4. When the object is only a short distance from the camera, the object occupies a larger area than the background, so the balance in the quantity of light between the object and the background is lost, and the object tends to be washed out on the photograph. In this embodiment, the light of the strobe is controlled to be extremely small when the object is only at a short distance from the camera and the external light brightness is high. As a result, the balance in the quantity of light between the object and the background is kept, and the object is prevented from being washed out on the photograph.

Figure 7:
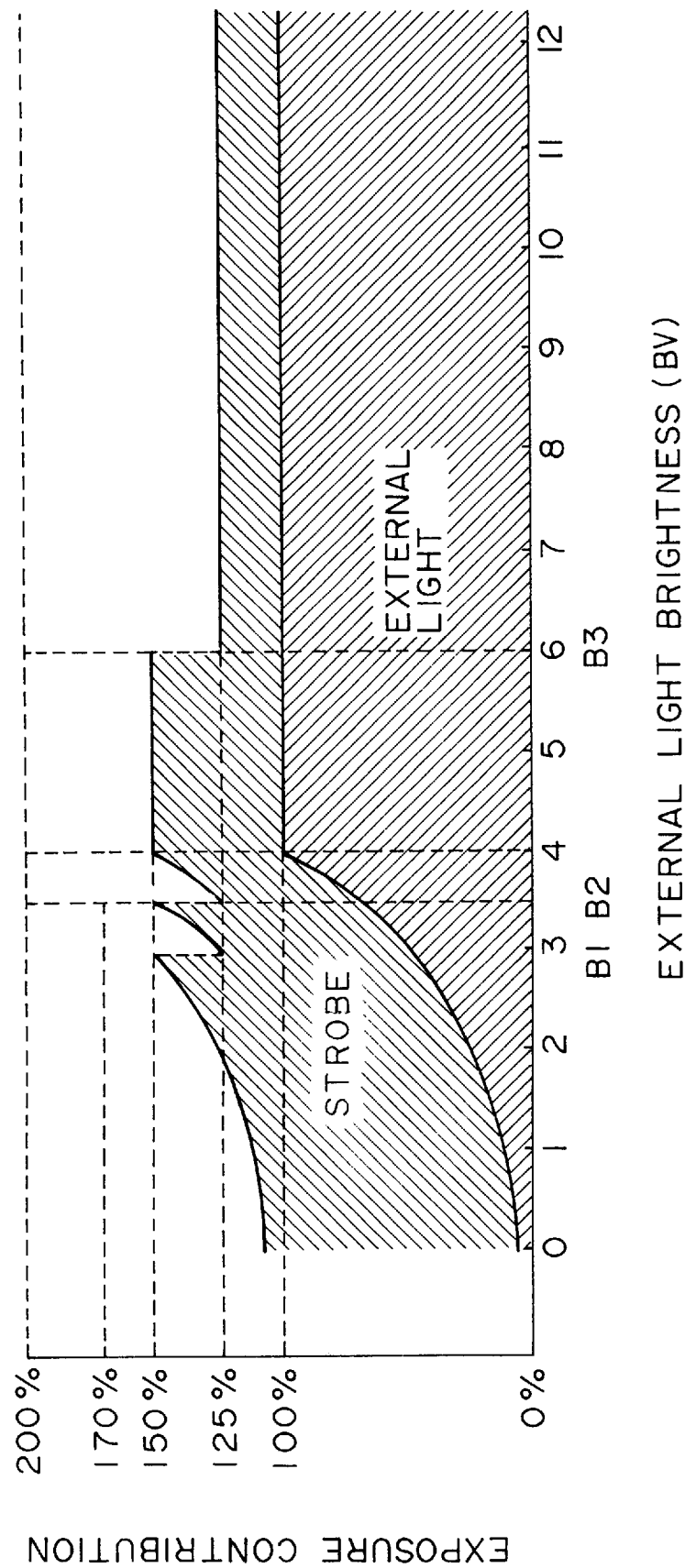
FIG. 7 is a view illustrating a relationship between the exposure of the strobe and the exposure of external light within the shot visual field when the distance between the camera and the object is from D1 to D2.

Fig. 7 shows a relationship between the exposure of the strobe 17 and the exposure of the external light when the distance between the object and the camera is D1–D2. FIG. 7 shows that the exposure by the external light is the same as in FIG. 6. The exposure by the external light is the same as in FIG. 6 when the external light brightness is less than B3, however, a processing for decreasing the exposure of the strobe 17 to ½ is not carried out even if the external light brightness is more than B4.

It is confirmed by an experiment that the balance in the quantity of light between the object and the background is not lost when the distance between the camera and the object is D1–D2 and the external light brightness is more than B4. Therefore, the processing of decreasing the exposure of the strobe 17 to ½ is not carried out when the external light brightness is B4.

Figure 8:
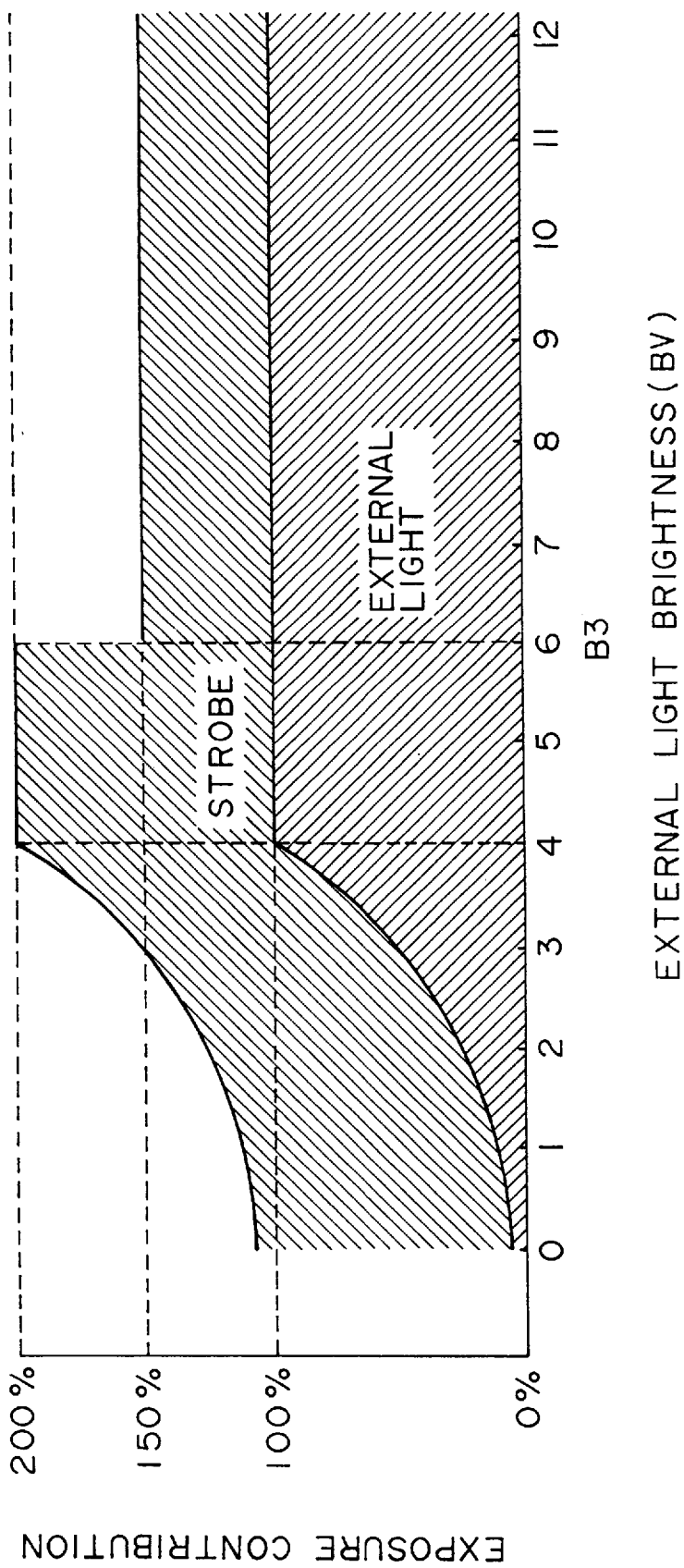
FIG. 8 is a view illustrating a relationship between the exposure of the strobe and the exposure of external light within the shot visual field when the distance between the camera and the object is from D2 to D3.

Next, FIG. 8 shows a relationship between the exposure of the strobe 17 and the exposure of the external light when the distance between the object and the camera is D2–D3. FIG. 8 is different from FIG. 7 in that the exposure of the strobe 17 does not decrease when the external light brightness is B1 and B2, and the exposure of the strobe 17 is 100% until the external light brightness is B3. Further, the processing of decreasing the exposure of the strobe 17 to ½ is not carried out when the external light brightness is B4.

When the distance between the object and the camera is more than D2, that is, when the distance is longer than the case of FIG. 7, the effect from decreasing the exposure of the strobe 17 is not conspicuous in the external light brightness of less than BV4 compared with when the object is at only a short distance from the camera as shown in FIGS. 6 and 7. Furthermore, it is confirmed by an experiment that the balance in the quantity of light between the object and the background is hardly lost, even if the total exposure is over the proper exposure in the whole area of the external light brightness.

Figure 9:
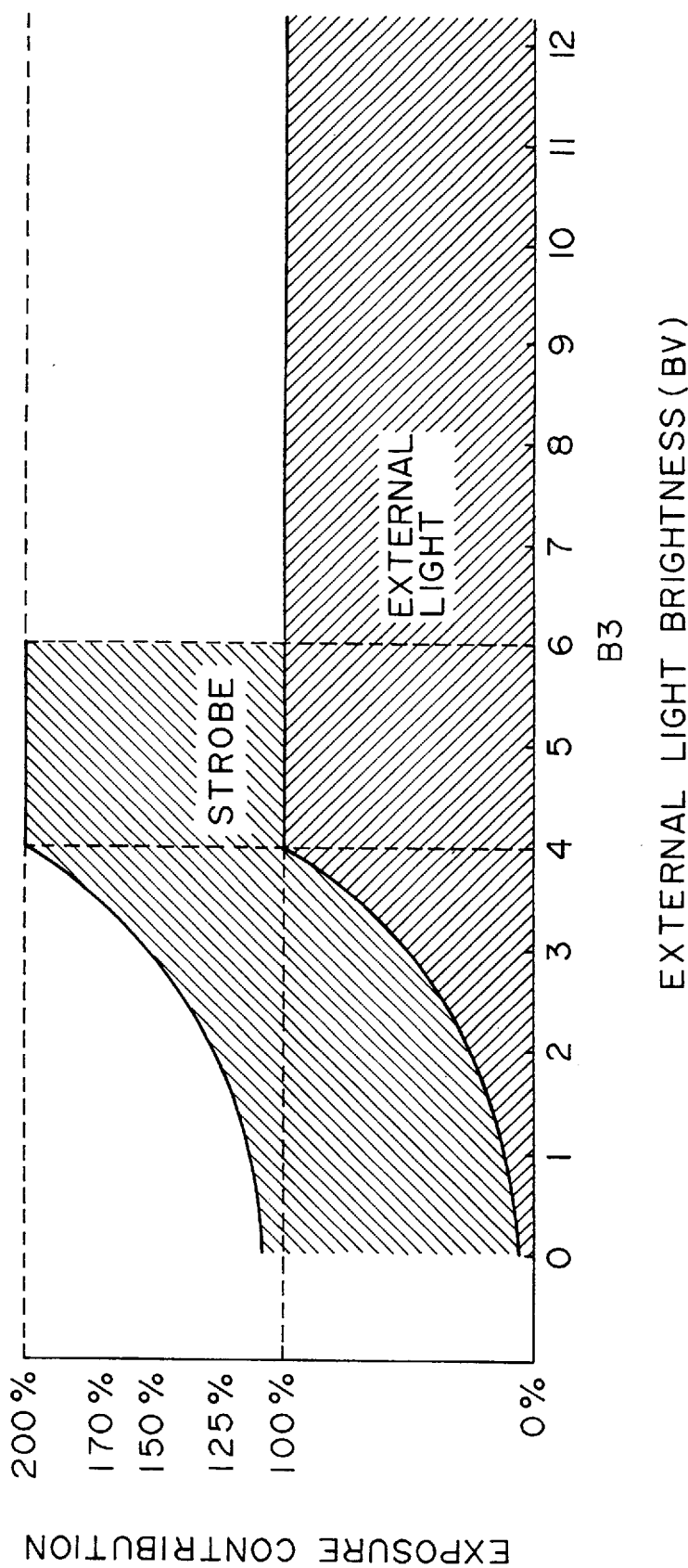
FIG. 9 is a view illustrating a relationship between the exposure of the strobe and the exposure of external light within the shot visual field when the distance between the camera and the object is more than D3.
Figure 10:
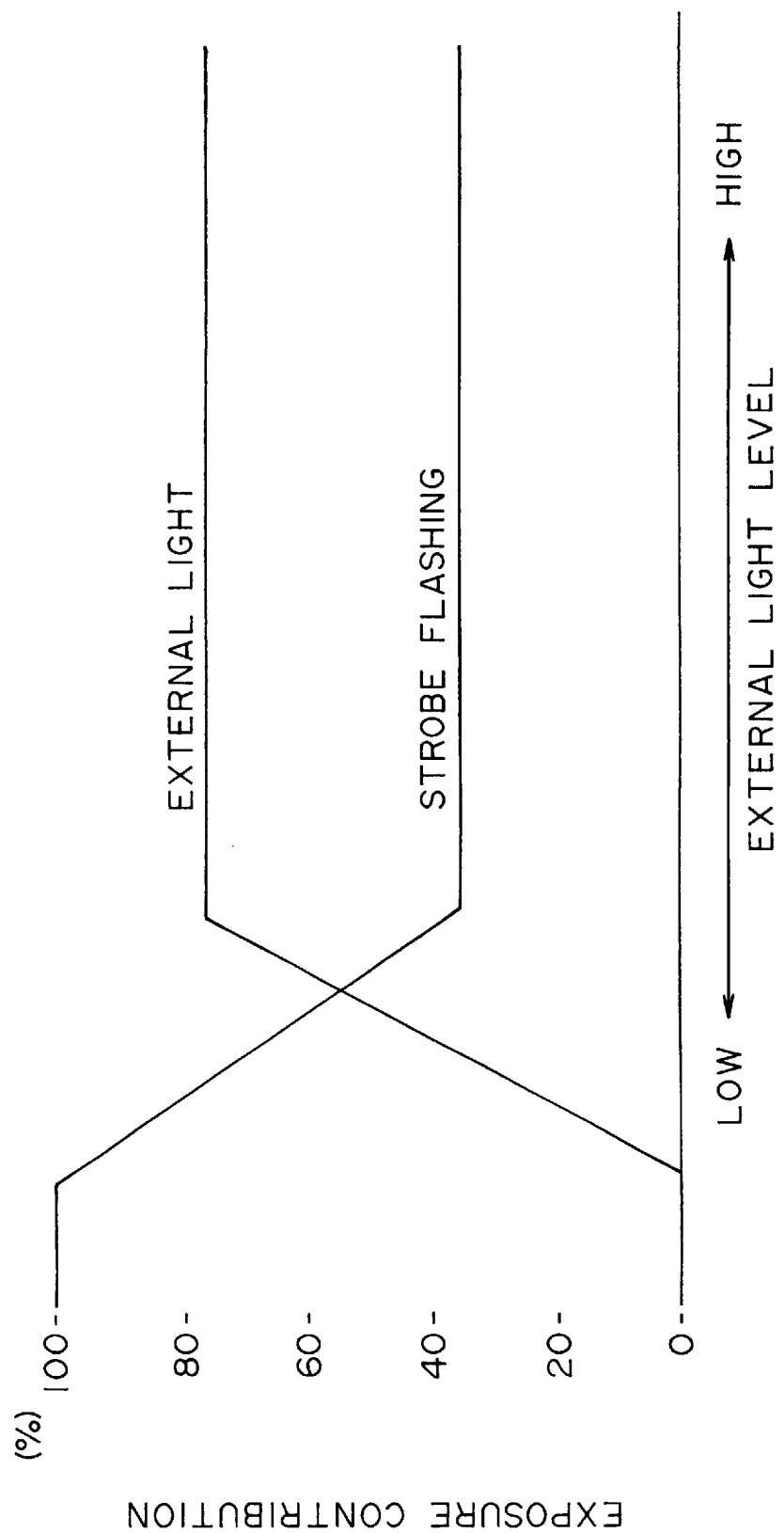
FIG. 10 is a view illustrating a relationship between the exposure of the strobe and the exposure of external light in a conventional built-in flash camera.

Next, FIG. 9 shows a relationship between the exposure of the strobe 17 and the exposure of the external light when the distance between the object and the camera is more than D3. FIG. 9 is similar to FIG. 8 in that the exposure by the strobe 17 is 100% until the external light brightness is B3. However, FIG. 9 is different from FIG. 8 in the following point. When the distance between the object and the camera is more than D3, the strobe light does not easily reach the object, and when the external light brightness is more than B2, the photographing is hardly influenced even if the strobe 17 is not flashed. Therefore, the strobe 17 is directed so as not to flash when the external light brightness is more than B3.

In this embodiment, the explanation was given of the correction table which is shown in FIG. 5. However, the mode of the correction table is not limited to this. The external light brightness, and the distance between the object and the camera may be classified into more or less levels than the correction table 21b which is shown in FIG. 5.

The above explanation relates to the film sensitivity ISO 100, however, the same effect can be achieved with regard to the other film sensitivities by sliding the BV value.

Incidentally, the present invention is not limited to the above-mentioned embodiment, and there are variations of the present invention. For example, the exposure is adjusted by subtly shifting the flash timing of the strobe from the shutter timing as shown in FIG. 2. However, the exposure may be adjusted by changing the quantity of the strobe light itself by fixing the flash timing of the strobe 17.

Moreover, the distance between the object and the camera is measured in an active method by means of the projector 14 and the acceptor 16. However, it may be measured in a passive method.

As has been described above, according to the built-in flash camera of the present invention, the strobe changeover brightness which is used for gradually decreasing the exposure of the strobe from the standard exposure is set to be lower than the reference external light brightness by a predetermined value. This is so the exposure by the strobe can be prevented from being excessively large when the brightness is in a proximity of the reference external light brightness.

The balance in the quantity of light between the object and the background can be maintained by controlling the exposure of the strobe. As a result, the object can be prevented from being washed out in the photograph, and the actual brightness of the background is not ruined.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A built-in flash camera including a strobe light therein, the built-in camera comprising:

a photometry part for measuring brightness within a shot visual field;

an automatic exposure mechanism for opening and closing a combination shutter and a stop blade so as to obtain a predetermined exposure in response to a measured brightness of external light being more than a predetermined reference external light brightness, the predetermined reference external light brightness being an external light brightness at which an optimum exposure is obtained when a shutter is opened for a predetermined time; and a strobe light control part for directing the strobe to flash regularly in connection with the opening and closing of the shutter and for decreasing the exposure of the strobe by a predetermined percentage in accordance with a change in the measured brightness, the strobe control part setting a strobe changeover brightness as a brightness which is lower than the reference external light brightness by a predetermined value, the strobe changeover brightness being a start brightness for decreasing the exposure from the standard exposure;

wherein said strobe control part controls an exposure amount of the strobe light to decrease gradually from a standard exposure amount as external brightness increases;

wherein the strobe light also emits when the external brightness is greater than the reference external light brightness.

2. A built-in flash camera including a strobe light therein, the built-in camera comprising:

a photometry part for measuring brightness within a shot visual field;

a focusing part for measuring a distance between the camera and an object within the shot visual field;

an automatic exposure mechanism for opening and closing a combination shutter and a stop blade so as to obtain a predetermined exposure in response to a measured brightness of external light being more than a predetermined reference external light brightness, the predetermined reference external light brightness being an external light brightness at which an optimum exposure is obtained when a shutter is opened for a predetermined time; and a strobe control part for controlling the strobe to be flashed regularly in connection with the opening and closing of the shutter and for decreasing the exposure of the strobe by a predetermined percentage in accordance with a change in the measured brightness and the measured distance, the strobe control part setting a strobe changeover brightness, as a brightness which is lower than the reference external light brightness by a predetermined value when the distance measured by the focusing part is less than a predetermined distance, wherein the strobe changeover brightness is a start brightness for decreasing the exposure from the standard exposure, wherein said strobe control part controls an exposure amount of the strobe light to decrease gradually from a standard exposure amount as external brightness increases;

wherein the strobe light also emits when the external brightness is greater than the reference external light brightness.

3. A built-in flash camera as set forth in claim 2, wherein a correction table is stored in the built-in flash camera, and wherein an aperture value, required for determining flash timing, is calculated in accordance with t he correction table so that the exposure of the strobe is adjusted.

4. A built-in flash camera as set forth in claim 3, wherein, in the correction table, distance between the camera and the object is classified into a plurality of levels and external light brightness within the shot visual field is classified into a plurality of levels, and a correction value for adjusting the exposure of the strobe is stored for each level.

5. The built-in flash camera of claim 4, wherein the exposure of the strobe is decreased by predetermined incremental percentages.

6. The built-in flash camera of claim 2, wherein, above a predetermined measured distance, the exposure of the strobe is either reduced to 0 or maintained at 100%.

7. The built-in flash camera of claim 6, wherein, above a predetermined measured brightness and above the predetermined measured distance, the exposure of the strobe is reduced to 0.

8. The built-in flash camera of claim 1, wherein, below a predetermined distance, the exposure of the strobe is decreased in proportion to increases in measured brightness.

* * * * *